F. A. BRUCKMAN.
PASTRY MAKING MACHINE.
APPLICATION FILED JUNE 8, 1916.

1,358,684.

Patented Nov. 9, 1920.

INVENTOR
F. A. Bruckman.
BY
Fred G. Dieterich
ATTORNEYS.

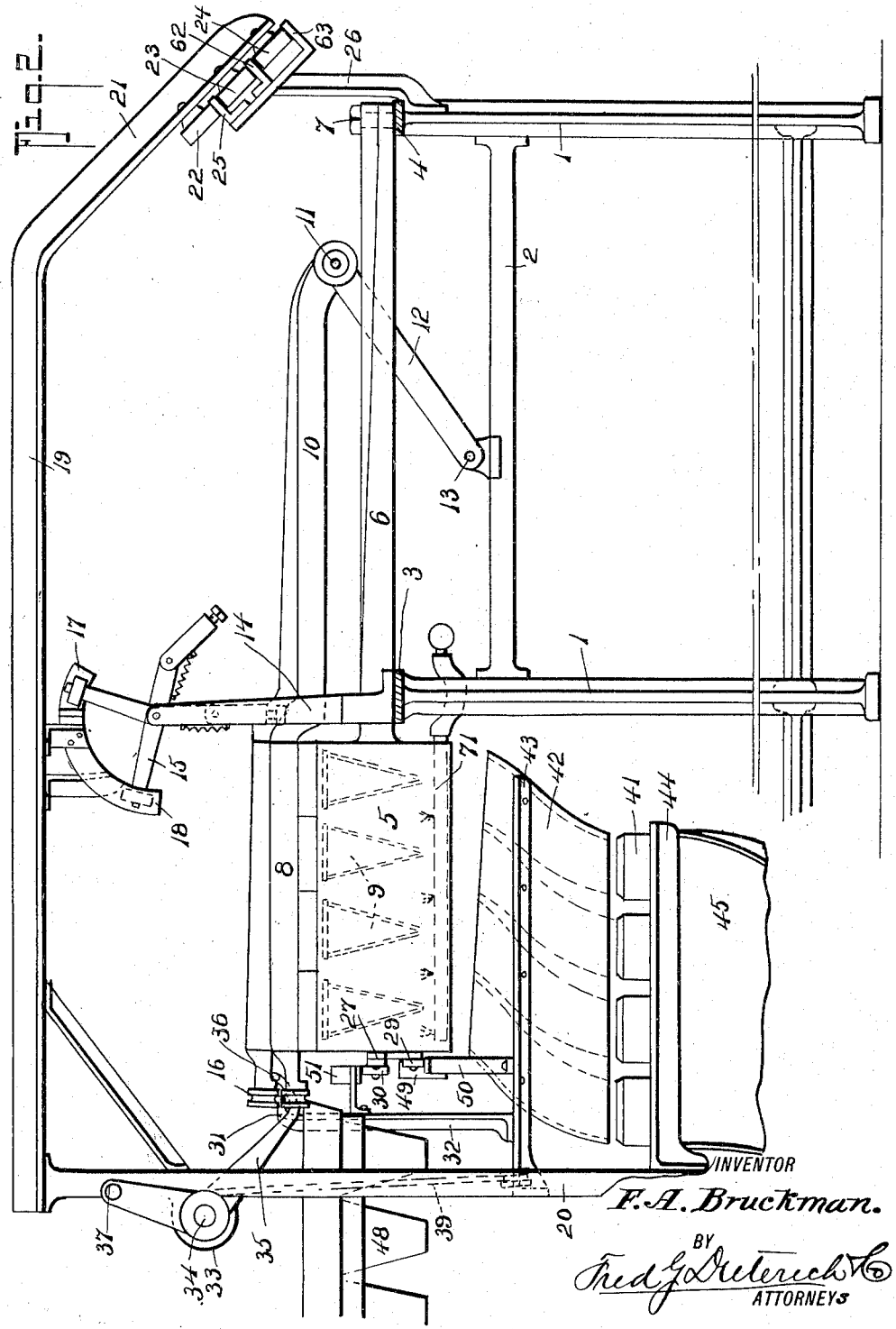

F. A. BRUCKMAN.
PASTRY MAKING MACHINE.
APPLICATION FILED JUNE 8, 1916.
1,358,684.
Patented Nov. 9, 1920.
3 SHEETS—SHEET 3.
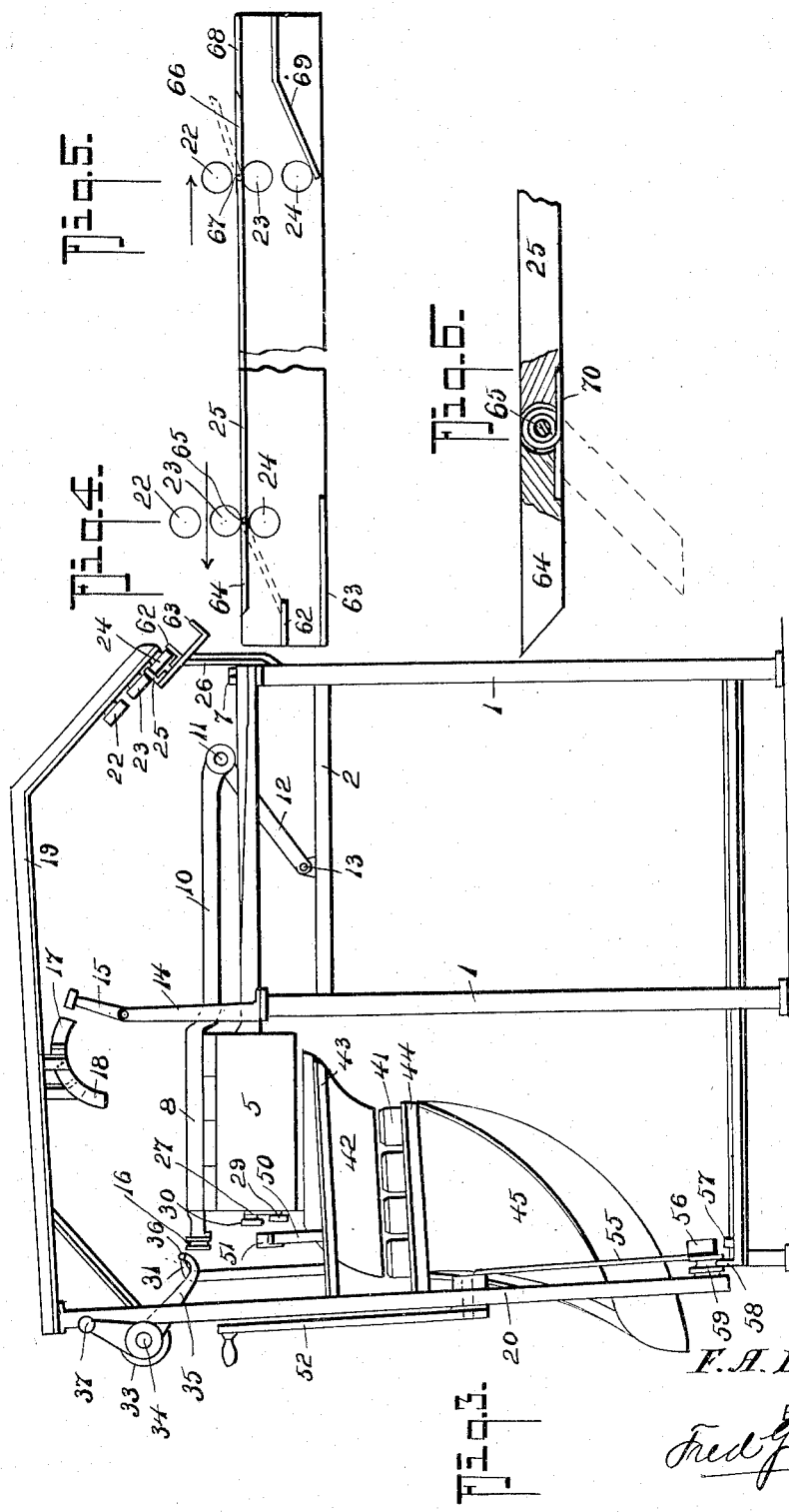
INVENTOR
F. A. Bruckman.
BY
Fred J. Dieterich & Co.
ATTORNEYS

UNITED STATES PATENT OFFICE.

FREDERICK A. BRUCKMAN, OF PORTLAND, OREGON.

PASTRY-MAKING MACHINE.

1,358,684.  Specification of Letters Patent.  Patented Nov. 9, 1920.

Application filed June 8, 1916. Serial No. 102,546.

*To all whom it may concern:*

Be it known that I, FREDERICK A. BRUCKMAN, residing at Portland, in the county of Multnomah and State of Oregon, have invented certain new and useful Improvements in Pastry-Making Machines, of which the following is a specification.

My invention has for its object to provide an apparatus for baking cup pastry and the like and the invention has been especially designed for use in making ice cream cones.

My present invention provides a machine embodying a large number of relatively stationarily located molding and baking devices, each of which consists of a parison mold and a core section therefor, the mold and core section embodying one or more molding units, there being devices provided for locking the halves of the parison mold together and for locking the core member with the cores in the parison mold.

The invention also provides a traveling carriage which is preferably rectilinearly movable across in front of the molding and baking devices; the carriage being provided with mechanism for unlocking, opening, closing and relocking the molding mechanism as the carriage is drawn along past the same; the carriage is also provided with a batter reservoir and dipping tank and with mechanism whereby the cores of the molds when unlocked may be removed, dropped into the batter and restored to the parison molds to effect the charging act; the carriage also is provided with devices for effecting the release or dropping of the baked cones from the molds, trimming the cones after they have been dropped and finally ejecting the same from the machine to a suitable place of collection; the machine also embodies a mechanism whereby as the carriage arrives at one end of its path of movement, it will be automatically operatively disconnected from the molding mechanism so that the carriage may be moved backwardly to the other extreme of its path of movement and other mechanism is provided for again automatically restoring the carriage to its relatively operative position.

The invention further includes those novel details of construction, operation and arrangement of parts, all of which will be first fully described, then be specifically pointed out in the appended claims and illustrated in the accompanying drawings, in which:—

Fig. 2 is a side elevation looking at the parts shown in Fig. 1, from right to left, the batter reservoir and its delivery spout to the dipping tank and the dipping tank supports being omitted for clearness of illustration.

Fig. 3 is an end elevation on a smaller scale, parts being omitted, to illustrate the manner in which the carriage is automatically operatively disconnected when ready to be returned to the starting place.

Figs. 4 and 5 are diagrammatic views of the mold guiding and shifting trackway, the portion shown in Fig. 4 being at the entrant end of the trackway and that shown in Fig. 5 designating the exit end of the same.

Fig. 6 is a detail view of a portion of the invention.

Figure 1:
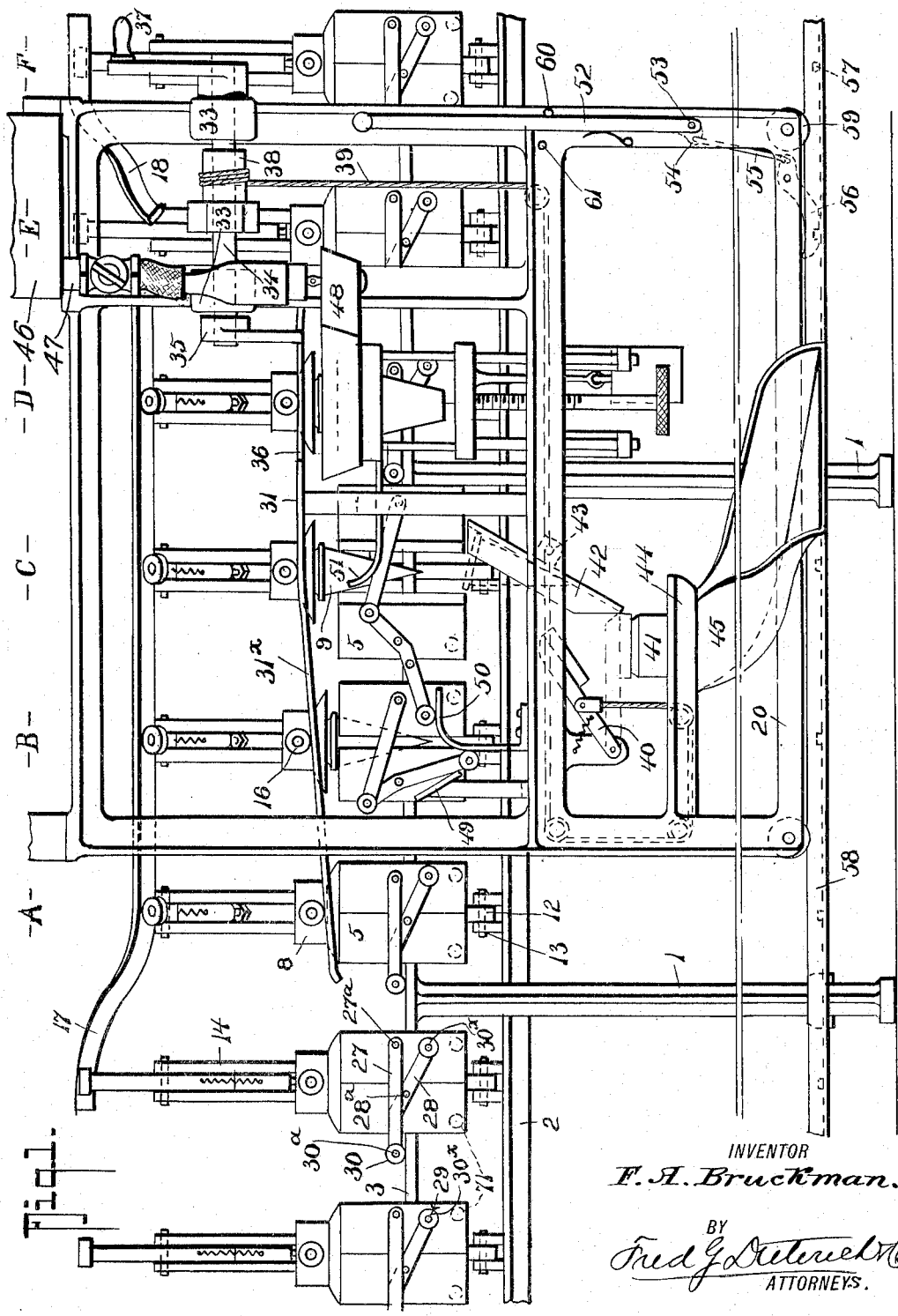
Figure 1 is an elevation of the invention, a part only of the plurality of molding devices and trackway etc. being shown.

In the drawings, in which like numerals and letters of reference designate like parts in all the figures, 1 represents the stationary frame-work bound together by cross beams 2 and longitudinal bars 3—4 respectively, on the latter of which the arms 6 of the parison molds 5 are fulcrumed at 7.

8 is the core bars which sustain the cores 9 of the respective sets of molding devices, the core bars 8 being carried by arms 10 which are pivoted at 11 to links 12 that are pivoted at 13 to the cross bars 2.

14 are the uprights which extend upwardly from the bar 3 on each side of the arms 6 and 10, and in the upper end of which the pivoted core bar latches 15 are locked.

The construction of the molding devices, *i. e.*, the parison molds 5, core bar 8 and cores 9, arms 6 and 10 and links 12, etc., may be the same as that disclosed in my Patent #1,071,027, issued August 26, 1913, and in this application, I make no claim, *per se*, to the construction of these parts.

As in my patent aforesaid, the core bars 8 are provided with rollers 16 which are designed to engage the trackway 31, hereinafter again referred to.

17 is a bar which is suspended from the cross beams 19 of the carriage and is designed to engage with the end of the core bar latch 15 at times to unlatch the core bars and 18 is a second bar which is suspended from the cross beams 19 and is designed to engage the latches 15 to relatch the cross bars after the molds have been charged. The latch 15 is an articulated member and may be of the same construction as that disclosed in my patent hereinbefore referred to.

The traveling carriage consists of a framework 20, 19 and 21 supported on rollers 59 which run on the trackway 58 that is located in front of the molding devices, the carriage being guided by a series of three rollers 22—23—24 which coöperate with the guide and track elements 25—62—63 supported on standards 26 from the frame 1, the traveling frame having back sections 21 which carry the rollers 22—23—24. The parison molds are opened, closed and latched by the latch devices best shown in Fig. 1, and the construction of which may be the same as that disclosed in my patent aforesaid, or that disclosed in my Patent #1,119,239, issued December 1, 1914. This latching mechanism consists essentially of a lever 27 pivoted at one end 27$^a$ to one of the mold sections and at the other end the same is pivoted at 30$^a$ to one end of a lever 28 that is pivoted at 28$^a$ to the other mold section, the place of pivotal connection between the levers 27—28 being provided with a roller 30 for a purpose presently understood, and the free end of the lever 28 is also provided with a roller 30$^x$ for the same purpose.

31 is a trackway that is carried by the traveling carriage and has its front portion upwardly inclined as at 31$^x$ whereby as the traveling carriage moves from right to left in Fig. 1, the trackway 31$^x$ will engage the rollers 16 of the core bars and raise the cores slightly in the molds to strip them loose from the baked cones in substantially the same manner as is done in my patented machine first above referred to. The trackway 31 alines with a finger 36 on the dipping shaft arm 35, whereby as the rollers 16 roll off the trackway 31 they will roll onto the finger 36. The construction of the dipping crank 35 and the finger for engaging the core bar roller may be the same as that disclosed in my patents above referred to and further description of the construction of the same is thought to be unnecessary.

The trackway 31—31$^x$ is supported in suitable standards 32 carried by the traveling carriage.

33 are bearings on the carriage frame in which the shaft 34 is journaled, the shaft 34 carrying the crank 35 and the operating lever or crank 37.

38 is a drum on which a cable 39 is adapted to be wound, the cable passing over a series of idler pulleys and being connected with the pushing lever 40 that passes the cones through the trimmer tubes 41. The trimmer tubes 41 are sustained on brackets 44 on the traveling frame. The trimmed product is pushed through the tubes 41 by the head of the pusher lever 40 and is delivered onto a chute 45 by which it is conveyed from the machine to any suitable collecting receptacle, not shown.

The cones are dropped from the molds when opened at position C in Fig. 1, onto a chute 42 sustained at 43 on the traveling frame and later, by the chute 42, are conveyed to the trimming tubes 41.

The construction of the chute 42 and trimming mechanism 40—41 may be the same as that disclosed in my patent first above referred to and therefore further description of the same is thought to be unnecessary. 49—50 are the parison mold unlocking devices and these may be of the same construction as disclosed in my patent first above referred to. The mold relocking bar 51 as well as the mold unlocking devices 49—50 are carried by the traveling frame in the present form of the invention.

46 is the batter reservoir mounted on the traveling frame and connected by a valved spout 47 with the dipping tank 48. The construction of the dipping tank 48 and the manner of mounting the same may be the same as disclosed in my patents above referred to save and except that instead of mounting the parts on a stationary frame they are mounted on the traveling carriage.

52 is a lever which is mounted at 53 on the traveling frame and operates between stops 60—61, the lever 52 being mounted on a shaft 53 that has a short arm 54 that is connected by a rod 55 to the heel of a foot 56 which is designed to engage the latch lugs 57 to hold the traveling carriage in its stepped positions along the track 58.

The manner of supporting the carriage in the operative and inoperative positions is best understood by reference to Figs. 2 to 5 inclusive, from which it will be seen that the brackets 26 support a plate on which is a main trackway 25, the entrant end of which, (see Fig. 4) is provided with a hinge section 64 that is adapted to be held normally in alinement with the trackway section 25 by a light spring 70. Where the end of the pivoted section 64 of the trackway comes, a short track section 63 is provided at a lower location (see Fig. 4) and below that is a short track section 63 so that as the carriage is drawn back, when in the position shown in Figs. 3—4 in the drawings, as the rollers 23—23 engage track section 64, the same will drop to position shown in dotted lines (the weight of the traveling carriage being sufficient for the purpose) until the roller 24 rides on track section 63 and track section 62 enters between the rollers 23—24. As roller 23 passes off the lowered end of the track section 64, the said track section will fly up into alinement with section 25 under the pressure of the spring 70 whereby as the carriage is moved forward from the extreme left hand position of Fig. 4 toward the position of Fig. 5, the track section 64 will enter between the rollers 22 and 23 so as to hold the traveling frame in its relatively operative position until the parts arrive at the position indicated in Fig. 5, i. e., when at the extreme end of the path of movement of the carriage. At the extreme end of the path of movement of the carriage the trackway 25 is provided with a hinge section 66 that is pivoted at 67 and lies normally against the fixed section 68 in alinement with the main track portion 25, the section 66, however, being capable of being lifted upwardly by roller 23 as roller 24 passes up the inclined track portion 69 toward the end of travel of the carriage. When the roller 23 has passed up to a position above the track section 68 the section 66 drops down into place again and on return movement of the carriage the same will be in the position shown in Fig. 3 whereby the mold operating parts will be in alinement with the parts with which they are designed to engage and the carriage drawn back without effecting any operation of the molding devices.

Suitable heating burners 71 are provided and the molds 5 are provided with suitable oven portions of substantially the same construction as is shown in my patents above referred to, and hence a detailed description of the same is thought to be unnecessary.

In operation, assume the carriage to be at the extreme right hand end of its path of travel in Fig. 1, it being understood that there is one traveling carriage and any number of molding devices as may be found desirable. As the bar 17 engages a core latch and the carriage has moved to the position shown in Fig. 1, the core latch of the particular mold in advance of the carriage will be unlatched. Assume the carriage to have moved so that the mold at position A has had its core bar unlatched, then the mold at position B will not only have had its core bar unlatched but the core bar will be slightly lifted by the trackway 31ˣ and the parison or female mold sections will be unlocked and opened. The molding devices at position C will have the core bar fully raised in the mold under the influence of the trackway portion 31, the parison molds fully opened and the baked cones discharged on the chute 42 by which they are delivered to the trimming tubes 41. The mold at position D will be ready to receive its charge of batter; the mold at position E will have received its charge of batter at a previous operation and the core bar will have been lowered and will be ready for relocking while the mold at position F will be fully locked and the baking process going on.

The operator then turns crank 37 in a counterclockwise direction which lifts the core bar out of the mold at position D and dips the cores into the dipping tank, at the same time winding up the cable and drawing down member 40 to push the baked cones through the trimmer tubes 41 onto the discharge chute 45 and thereby simultaneously effecting the trimming act. By turning the lever 37 back again, the cores are lifted out of the tank and restored to the molds and the machine is ready to be moved one step farther. This is done by rocking lever 52 to release the foot latch 56 and move it into engagement with the next succeeding lug 57 at which place the foregoing operation is repeated.

From the foregoing, it will be seen that it is only necessary for the operator to move the carriage along the trackway 58 in a step-by-step manner and turn the crank 37 at each step to effect the loading operation.

When the carriage has passed all of the molding devices it is automatically tilted forward to position shown in Fig. 2, as before described, and then can be drawn back to the extreme right hand end of the trackway, again ready for a repetition of the cycle of operations.

Many changes in the details of construction of the various parts comprising the invention may be made without departing from the spirit of the same or the scope of the appended claims.

What I claim is:

1. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices.

2. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices, said molding devices including heat applying instrumentalities for effecting the baking operation.

3. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold-section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices.

4. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold-section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices, said molding devices including ovens and heat appliances for effecting the baking operation, trimming mechanism on said carriage, means on the carriage for receiving the product discharged from the molding devices and conveying the same to the trimmers and means for conveying the trimmed product out of the machine.

5. In a machine of the character described, a plurality of sets of relatively stationarily located serially arranged molding devices each including parison molds and cores therefor, and mold and core locking devices; combined with a traveling carriage designed to be passed by the molding devices, mechanism on said carriage for unlocking the molding devices as the carriage approaches the same, mechanism on said carriage for raising the cores of the molding devices to strip the molded product from the same, other mechanism on the carriage for relocking molding devices and batter supplying instrumentalities carried by the carriage for supplying the molding devices with batter.

6. In a machine of the character described, a plurality of sets of relatively stationarily located serially arranged molding devices each including parison molds and cores therefor, and mold and core locking devices; combined with a traveling carriage designed to be passed along in front of the molding devices, mechanism on said carriage for unlocking the molding devices as the carriage approaches the same, mechanism on said carriage for raising the cores of the molding devices to strip the molded product from the same, other mechanism on the carriage for relocking the molding devices, batter supplying instrumentalities carried by the carriage for supplying the molding devices with batter, trimming mechanism on the carriage and means for conveying the molded product from the molding devices to the trimming mechanism.

7. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices, means for moving said carriage to an inoperative position when it arrives at one end of its path of travel so that said carriage may be drawn back to the starting place without effecting an operation on the molding devices.

8. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices, said molding devices including heat applying instrumentalities for effecting the baking operation, means for moving said carriage to an inoperative position when it arrives at one end of its path of travel so that said carriage may be drawn back to the starting place without effecting an operation on the molding device.

9. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices, means for moving said carriage to an inoperative position when it arrives at one end of its path of travel so that said carriage may be drawn back to the starting place without effecting an operation on the molding devices.

10. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold-section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices, said molding devices including ovens and heat appliances for effecting the baking operation, trimming mechanism on said carriage, means on the carriage for receiving the product discharged from the molding devices and conveying the same to the trimmers, means for conveying the trimmed product out of the machine, means for moving said carriage to an inoperative position when it arrives at one end of its travel so that said carriage may be drawn back to the starting place without effecting an operation on the molding devices.

11. In a machine of the character described, a plurality of sets of relatively stationarily located serially arranged molding devices each including parison molds and cores therefor, and mold and core locking devices; combined with a traveling carriage designed to be passed along in front of the molding devices, mechanism on said carriage for unlocking the molding devices as the carriage approaches the same, mechanism on said carriage for raising the cores of the molding devices to strip the molded product from the same, other mechanism on the carriage for relocking the molding devices, batter supplying instrumentalities carried by the carriage for supplying the molding devices with batter, means for moving said carriage to an inoperative position when it arrives at one end of its path of travel so that said carriage may be drawn back to the starting place without effecting an operation on the molding devices.

12. In a machine of the character described, a plurality of sets of relatively stationarily located serially arranged molding devices each including parison molds and cores therefor, and mold and core locking devices; combined with a traveling carriage designed to be passed along in front of the molding devices, mechanism on said carriage for unlocking the molding devices as the carriage approaches the same, mechanism on said carriage for raising the cores of the molding devices to strip the molded product from the same, other mechanism on the carriage for relocking the molding devices, batter supplying instrumentalities carried by the carriage for supplying the molding devices with batter, trimming mechanism on the carriage, means for conveying the molded product from the molding devices to the trimming mechanism, means for moving said carriage to an inoperative position when it arrives at one end of its path of travel so that said carriage may be drawn back to the starting place without effecting an operation on the molding devices.

13. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices, means for moving said carriage to an inoperative position when it arrives at one end of its path of travel so that said carriage may be drawn back to the starting place without effecting an operation on the molding devices, and means at said starting place for restoring said carriage to the operative position.

14. In a machine of the class described, a plurality of serially arranged relatively stationarily located sets of molding devices, each set including parison molds and cores therefor, means for holding the mold sections closed, a traveling carriage adapted to be moved along from one set of molding devices to another, a batter reservoir on said carriage, mold loading mechanism on the carriage for transferring the batter to the molding devices, devices on the carriage for opening and closing the molding devices to discharge the molded product and prepare the same for the reception of new batter charges as the carriage is moved from one position to another past the several molding devices, said molding devices including heat applying instrumentalities for effecting the baking operation, means for moving said carriage to an inoperative position when it arrives at one end of its path of travel so that said carriage may be drawn back to the starting place without effecting an operation on the molding device, and means at said starting place for restoring said carriage to the operative position.

15. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices, means for moving said carriage to an inoperative position when it arrives at one end of its path of travel so that said carriage may be drawn back to the starting place without effecting an operation on the molding device, and means at said starting place for restoring said carriage to the operative position.

16. In a machine of the class described, a plurality of sets of molding devices relatively stationarily located, a carriage adapted to be passed along from one set of molding devices to another, each of said molding devices including parison molds and cores therefor, and mold-section securing latches, a batter reservoir on the carriage, devices on the carriage for engaging said mold-section securing devices to unlock the same and open the molds, devices on the carriage for raising the cores in the molds to strip the molded product from the same, a device on the carriage for engaging the mold securing means to reclose the parison mold sections, instrumentalities on the carriage for transferring the batter from the reservoir to the molding devices, said molding devices including ovens and heat appliances for effecting the baking operation, trimming mechanism on said carriage, means on the carriage for receiving the product discharged from the molding devices and conveying the same to the trimmers, means for conveying the trimmed product out of the machine, means for moving said carriage to an inoperative position when it arrives at one end of its travel so that said carriage may be drawn back to the starting place without effecting an operation on the molding devices, and means at said starting place for restoring said carriage to the operative position.

17. In a machine of the character described, a plurality of sets of relatively stationarily located serially arranged molding devices each including parison molds and cores therefor, and mold and core locking devices; combined with a traveling carriage designed to be passed along in front of the molding devices, mechanism on said carriage for unlocking the molding devices as the carriage approaches the same, mechanism on said carriage for raising the cores of the molding devices to strip the molded product from the same, other mechanism on the carriage for relocking the molding devices, batter supplying instrumentalities carried by the carriage for supplying the molding devices with batter, means for moving said carriage to an inoperative position when it arrives at one end of its path of travel so that said carriage may be drawn back to the starting place without effecting an operation on the molding devices, and means at said starting place for restoring said carriage to the operative position.

18. In a machine of the character described, a plurality of sets of relatively stationarily located serially arranged molding devices each including parison molds and cores therefor, and designed to be passed along in front of the molding devices, mechanism on said carriage for unlocking the molding devices as the carriage approaches the same, mechanism on said carriage for raising the cores of the molding devices to strip the molded product from the same, other mechanism on the carriage for relocking the molding devices, batter supplying instrumentalities carried by the carriage for supplying the molding devices with batter, trimming mechanism on the carriage, means for conveying the molded product from the molding devices to the trimming mechanism, means for moving said carriage to an inoperative position when it arrives at one end of its path of travel so that said carriage may be drawn back to the starting place without effecting an operation on the molding devices, and means at said starting place for restoring said carriage to the operative position.

19. In a machine of the class described, a plurality of sets of relatively stationarily located molding devices arranged *seriatim*, each of said molding devices including parison molds and cores therefor, means connecting the parison mold sections together whereby they may be opened or closed, a traveling carriage designed to be passed along from one set of molding devices to another, means for holding said carriage in position with relation to any of said molding devices, a device on said carriage for lifting said cores as said carriage approaches the molding devices to strip the cores from the molded product, projections on said carriage to engage said parison mold-section-connecting means for opening and closing said parison mold sections to discharge the molded product and restore the mold sections for the reception of another charge of batter, a batter reservoir, and means on said carriage for effecting a transfer of the batter from the reservoir to the molding devices.

20. In a machine of the class described, a plurality of sets of relatively stationarily located molding devices arranged *seriatim*, each of said molding devices including parison molds and cores therefor, means connecting the parison mold sections together whereby they may be opened or closed, a traveling carriage designed to be passed along from one set of molding devices to another, means for holding said carriage in position with relation to any of said molding devices, a device on said carriage for lifting said cores as said carriage approaches the molding devices to strip the cores from the molded product, projections on said carriage to engage said parison mold-section-connecting means for opening and closing said parison mold sections to discharge the molded product and restore the mold sections for the reception of another charge of batter, a batter reservoir, means on said carriage for effecting a transfer of the batter from the reservoir to the molding devices, a trimming mechanism on said mold and means for conveying the product discharged from the molding devices to the trimming mechanism.

21. In a machine of the class described, a plurality of sets of relatively stationarily located molding devices arranged *seriatim*, each of said molding devices including parison molds and cores therefor, means connecting the parison mold sections together whereby they may be opened or closed, a traveling carriage designed to be passed along from one set of molding devices to another, means for holding said carriage in position with relation to any of said molding devices, a device on said carriage for lifting said cores as said carriage approaches the molding devices to strip the cores from the molded product, projections on said carriage to engage said parison mold-section-connecting means for opening and closing said parison mold sections to discharge the molded product and restore the mold sections for the reception of another charge of batter, a batter reservoir, means on said carriage for effecting a transfer of the batter from the reservoir to the molding devices, said batter transferring means comprising devices on the carriage for engaging the cores, lifting them from the molds, dipping the same into the batter and restoring the same to the molds with the adhering charge of batter.

22. In a machine of the class described, a plurality of sets of molding devices arranged in a row, each set of molding devices comprising sectional molds and cores for the same, a carriage arranged to be passed along by the molds, batter supplying instrumentalities on said carriage, mold opening and closing mechanism on the carriage, and means for holding the carriage in position with respect to the different molds while effecting the operation of charging the molds with batter.

23. In a machine of the class described, a plurality of sets of molding devices relatively stationarily located and each comprising a pair of female half molds and a core for the same, devices connecting said half molds together, a carriage designed to be passed by said molds, a batter reservoir on said carriage, means on said carriage for engaging said half mold connecting means to open the half mold sections, means on said carriage for raising the cores to strip the cones from the same, means on said carriage for engaging said half mold connecting means to reclose said half mold members, and mechanism on the carriage coöperating with the molding devices for supplying batter thereto, said molding devices including heat applying instrumentalities for baking purposes.

24. In a machine of the class described, a plurality of sets of molding devices relatively stationarily located and each comprising a pair of female half molds and a core for the same, devices connecting said half molds together, a carriage designed to be passed by said molds, a batter reservoir on said carriage, means on said carriage for engaging said half mold connecting means to open the half mold sections, means on said carriage for raising the cores to strip the cones from the same, means on said carriage for engaging said half mold connecting means to reclose said half mold members, mechanism on the carriage coöperating with the molding devices for supplying batter thereto, said molding devices including heat applying instrumentalities for baking purposes, mechanism on said carriage for receiving the baked cone from the molding devices, trimming the same and discharging the same, when trimmed, from the machine.

25. In a machine of the class described, a plurality of serially arranged relatively stationarily located sets of molding devices, each set including parison molds and cores therefor, means for holding said mold sections closed, a traveling carriage adapted to be moved along from one set of molding devices to another, a batter reservoir on said carriage, means for coating the cores with batter from said reservoir, devices on the carriage for opening and closing the molding devices to discharge the molded product and prepare the same for the reception of new batter charges as the carriage is moved from one position to another past the several molding devices.

26. In a machine of the class described, a plurality of serially arranged relatively stationarily located sets of molding devices, each set including parison molds and cores therefor, means for holding said mold sections closed, a traveling carriage adapted to be moved along from one set of molding devices to another, a batter reservoir on said carriage, means for coating the cores with batter from said reservoir, devices on the carriage for opening and closing the molding devices to discharge the molded product and prepare the same for the reception of new batter charges as the carriage is moved from one position to another past the several molding devices, said molding devices including heat applying instrumentalities for effecting the baking operation.

27. In a machine of the class described, a plurality of serially arranged relatively stationarily located sets of molding devices each set including parison molds and cores therefor, means for holding said mold sections closed, a traveling carriage adapted to be moved along from one set of molding devices to another, a batter reservoir on said carriage, means for supplying said molding devices with batter from said reservoir, devices on the carriage for opening and closing the molding devices to discharge the molded product and prepare the same for the reception of new batter charges as the carriage is moved from one position to another past the several molding devices.

28. In a baking machine including a carriage for conveying batter to the oven and moving adjacent the latter, an oven comprising a core, a conforming mold for said core comprising separable parts, pivoted arms operating the separable parts, means for heating the oven, and means on the carriage for operating said pivoted arms whereby said molds are opened and closed in time with the movement of the carriage.

29. In a baking machine including a carriage for conveying the batter to the ovens and moving adjacent the latter, a plurality of ovens comprising cores and conforming molds for said cores comprising separable parts, pivoted arms operating the separable parts, means for heating the ovens, and cam elements on the carriage for operating said pivoted arms whereby said molds are opened and closed in time with the movement of the carriage.

30. In a machine of the class described, a plurality of sets of baking mold devices arranged in a row, said devices including baking molds proper, and mold opening and closing elements with means for heating the molds proper, a batter supplying carriage with operating mechanism to coöperate with said mold opening and closing elements for charging and discharging the molds as said carriage is moved in one direction only.

31. In a machine of the class described, a plurality of sets of baking mold devices arranged in a row, said devices including baking molds proper, and mold opening and closing elements with means for heating the molds proper, a batter supplying carriage with operating mechanism to coöperate with said mold opening and closing elements for charging and discharging the molds as said carriage is moved in one direction, and means rendering said operating mechanism inoperative when the direction of movement of the carriage is reversed.

32. In a machine of the class described, a plurality of sets of baking mold devices arranged in a row, said devices including baking molds proper, and mold opening and closing elements with means for heating the molds proper, a batter supplying carriage with operating mechanism to coöperate with said mold opening and closing elements for charging and discharging the molds as said carriage is moved in one direction, means rendering said operating mechanism inoperative when the direction of movement of the carriage is reversed, said last named means comprising mechanism for moving said carriage to an inoperative position when it arrives at one end of its path of travel so that said carriage may return to the starting place without effecting said molding devices.

FREDERICK A. BRUCKMAN.